United States Patent
Flack et al.

(10) Patent No.: US 11,132,713 B2
(45) Date of Patent: *Sep. 28, 2021

(54) SYSTEM AND METHOD FOR ESTIMATING VISUAL IMPRESSIONS OF VEHICLES CONFIGURED WITH EXTERNAL GRAPHIC MESSAGING

(71) Applicant: Wrapify, Inc., Solana Beach, CA (US)

(72) Inventors: Timothy Allan Flack, San Diego, CA (US); Philip Chen, Carlsbad, CA (US); James Sevan Heller, Escondido, CA (US)

(73) Assignee: Wrapify, Inc., Solana Beach, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 16/367,007

(22) Filed: Mar. 27, 2019

(65) Prior Publication Data
US 2019/0355018 A1 Nov. 21, 2019

Related U.S. Application Data

(63) Continuation of application No. 15/452,659, filed on Mar. 7, 2017, now Pat. No. 10,373,205.

(Continued)

(51) Int. Cl.
*G06Q 30/02* (2012.01)
*G01C 21/34* (2006.01)
(Continued)

(52) U.S. Cl.
CPC ..... *G06Q 30/0266* (2013.01); *G01C 21/3492* (2013.01); *G01C 21/3667* (2013.01); *G01S 19/42* (2013.01); *G06F 3/147* (2013.01); *G06F 16/22* (2019.01); *G06Q 30/02* (2013.01); *G06Q 30/0242* (2013.01); *G06Q 30/0267* (2013.01); *G09F 21/04* (2013.01); *H04L 67/12* (2013.01)

(58) Field of Classification Search
None
See application file for complete search history.

(56) References Cited

U.S. PATENT DOCUMENTS 9,147,192 B2 * 9/2015 Dawson ............ G06Q 30/0261
2002/0084891 A1 * 7/2002 Mankins .................. B60Q 1/50
340/425.5

(Continued)

*Primary Examiner* — Abdhesh K Jha
(74) *Attorney, Agent, or Firm* — Cooley LLP

(57) ABSTRACT

An impression estimation system for estimating visual impressions of a plurality of vehicles configured with exterior graphic messaging. A mobile device application of each of a plurality of mobile devices associated with the plurality of vehicles generates vehicle mobility data. A computational platform includes a processor and program code which, when executed by the processor, causes the processor to, with respect to each vehicle of the plurality of vehicles: (i) identify, using the vehicle mobility data, one or more of the road segments in which the vehicle was present; (ii) estimate, using the traffic volume data, a number of potential visual impressions of the vehicle within the road segments; (iii) determine an estimated number of visual impressions; (iv) generate visual impression information based at least in part upon the estimated number of visual impressions; and (v) cause display of the visual impression information.

6 Claims, 7 Drawing Sheets

Related U.S. Application Data

(60) Provisional application No. 62/367,038, filed on Jul. 26, 2016.

(51) Int. Cl.
| | | |
|---|---|---|
| *G01C 21/36* | (2006.01) | |
| *G06F 16/22* | (2019.01) | |
| *G01S 19/42* | (2010.01) | |
| *G06F 3/147* | (2006.01) | |
| *G09F 21/04* | (2006.01) | |
| *H04L 29/08* | (2006.01) | |

(56) References Cited

U.S. PATENT DOCUMENTS

| | | | |
|---|---|---|---|
| 2002/0112026 A1* | 8/2002 | Fridman | G08G 1/127 709/217 |
| 2014/0257969 A1* | 9/2014 | Topchy | G06Q 30/0242 705/14.42 |
| 2015/0150035 A1* | 5/2015 | Chizi | H04N 21/812 725/14 |
| 2017/0309171 A1* | 10/2017 | Zhao | G01S 19/13 |

* cited by examiner

SYSTEM AND METHOD FOR ESTIMATING VISUAL IMPRESSIONS OF VEHICLES CONFIGURED WITH EXTERNAL GRAPHIC MESSAGING

This application is a continuation of U.S. application Ser. No. 15/452,659, entitled "SYSTEM AND METHOD FOR ESTIMATING VISUAL IMPRESSIONS OF VEHICLES CONFIGURED WITH EXTERNAL GRAPHIC MESSAGING", filed on Mar. 7, 2017, which claims the benefit of U.S. Provisional Application No. 62/367,038, filed on Jul. 26, 2016. The content of these applications are hereby incorporated by referenced in their entirety for all purposes.

BACKGROUND

Businesses often attempt to increase consumer awareness by placing messaging identifying or promoting products or services on mass transit vehicles (e.g., buses). Such messaging may also be conveyed by configuring the exteriors of a business' fleet or other vehicles with text and/or graphics identifying the business and/or its products or services. However, a business entity has no way of quantifying the visual impressions of such messaging by potential consumers; that is, the business has no way of determining how many consumers actually view these messages.

Systems have been proposed for configuring vehicles with a messaging device (e.g., a display) capable of being updated with messages intended for viewing by occupants of other vehicles. In such systems the message may be changed more frequently when the system detects that the vehicle with the messaging device is being slowed by traffic. However, such systems are unable to estimate how many other vehicles are capable of viewing the messages.

SUMMARY

In general, the disclosure relates to a system and method for estimating visual impressions of vehicles configured with external graphic messaging. Consider that a vehicle moving along a path from one location to another, or positioned in a certain location, will be visible to occupants of other vehicles which have traveled the same path or are otherwise within the same vicinity. These vehicle occupants will be in a position to receive visual impression of the vehicle's aesthetic appearance (e.g., make, model, color, year, or vehicle messaging/advertising). Disclosed herein is a system and method of attributing how many unique visual impressions a moving or non-moving vehicle receives for the purposes of, for example, advertising, marketing, or research.

In one particular aspect the disclosure pertains to a system for estimating visual impressions of a plurality of vehicles configured with exterior graphic messaging viewable by occupants of other vehicles. The system includes a plurality of mobile devices associated with the plurality of vehicles, each of the plurality of mobile devices including a mobile device application operative to acquire information relating to mobility of the vehicle (e.g., information relating to the location and speed of the vehicle at various times). A server is configured to receive vehicle mobility data generated by the mobile device application of each of the plurality of mobile devices. A database stores traffic volume data in association with a plurality of road segments. A computational platform includes a processor and program code which, when executed by the processor, causes the processor to, with respect to each vehicle of the plurality of vehicles: (i) identify, using the vehicle mobility data, one or more of the plurality of road segments in which the vehicle was present; (ii) estimate, using the traffic volume data, a number of potential visual impressions of the vehicle within the one or more of the plurality of road segments; (iii) determine an estimated number of visual impressions by modifying the number of potential visual impressions in accordance with an environmental filter wherein the environmental filter relates at least to an anticipated visibility of the vehicle to other vehicles present within the one or more of the plurality of road segments; (iv) generate visual impression information based at least in part upon the estimated number of visual impressions; and (v) provide the visual impression information for display by a display device.

In one implementation the processor is configured to, with respect to each vehicle of the plurality of vehicles: (i) determine, based upon the mobility data, sets of road segments traversed by the vehicle, and (ii) determine the number of potential impressions using portions of the traffic volume data corresponding to the set of road segments. The processor may also determine the estimated number of visual impressions by determining a relationship between a speed of the vehicle within the one or more of the plurality of road segments at a given time and a free flow speed of traffic within the segment at the given time.

The disclosure also relates to a method for estimating visual impressions of a vehicle configured with exterior graphic messaging intended for viewing by occupants of other vehicles. The method includes receiving, from an API gateway, vehicle mobility data included within wireless signals generated by a mobile device configured with a mobile device application operative to acquire information relating to mobility of the vehicle. The method further includes storing traffic volume data in association with a plurality of road segments and identifying, using the vehicle mobility data, one or more of the plurality of road segments in which the vehicle was present. A number of potential visual impressions of the vehicle within the one or more of the plurality of road segments may be estimated using the traffic volume data. The method also includes determining an estimated number of visual impressions by modifying the number of potential visual impressions in accordance with an environmental filter wherein the environmental filter relates at least to an anticipated visibility of the vehicle to other vehicles present within the one or more of the plurality of road segments. Visual impression information may then be displayed based at least in part upon the estimated number of visual impressions.

In another aspect the disclosure pertains to a method for navigating a vehicle configured with exterior graphic messaging intended for viewing by occupants of other vehicles. The method includes sending, from a mobile device associated with the vehicle, wireless signals including vehicle mobility data related to at least location of the vehicle at a plurality of times. The method further includes sending, from the mobile device, a request for a route recommendation for the vehicle wherein in response to the vehicle mobility data and traffic volume data one or more route recommendations are determined. The route recommendations correspond to vehicle routes associated with a higher number of viewing impressions of the exterior graphic messaging by the occupants of the other vehicles than other potential vehicle routes. The method also includes receiving the route recommendations at the mobile device. The vehicle may then be navigated in accordance with at least one of the route recommendations.

The disclosure also describes a method for navigating a vehicle configured with exterior graphic messaging intended for viewing by occupants of other vehicles. The method includes sending, from a mobile device associated with the vehicle, wireless signals including vehicle mobility data related to at least location of the vehicle at a plurality of times. The method further includes sending, from the mobile device, a request for a route recommendation for the vehicle wherein in response to the vehicle mobility data and traffic volume data one or more route recommendations are determined. The route recommendations may correspond to vehicle routes associated with a higher number of viewing impressions of the exterior graphic messaging by the occupants of the other vehicles than other potential vehicle routes. The method also includes receiving the route recommendations at the mobile device and optionally displaying them as map overlays.

The teachings of the disclosure may also be applied to a system including a plurality of vehicles having exteriors configured to convey messaging to occupants of other vehicles. Each of the vehicles are configured with exterior graphic messaging associated with a product or service and a plurality of mobile devices may be associated with the plurality of vehicles. In this context an impression estimation system for estimating visual impressions of the plurality of vehicles may be utilized. The impression estimation system may include a gateway API to which is posted vehicle mobility data generated by a mobile device application of each of the plurality of mobile devices wherein the mobility data includes data specifying locations of each of the plurality of vehicles at associated times. The impression estimation system may further include a database storing traffic volume data in association with a plurality of road segments. A computational platform is configured with a processor and program code which, when executed by the processor, causes the processor to, with respect to each vehicle of the plurality of vehicles: (i) determine, based upon the mobility data, a set of road segments traversed by the vehicle; (ii) determine an estimated number of visual impressions using portions of the traffic volume data corresponding to the set of road segments; (iii) generate visual impression information based at least in part upon the estimated number of visual impressions; and (iv) provide the visual impression information for display by a display device.

The teachings of the disclosure may be further applied to a system including a plurality of vehicles having exteriors configured to convey messaging to occupants of other vehicles. Each of the vehicles are configured with exterior graphic messaging associated with a product or service. A plurality of mobile devices may be associated with the plurality of vehicles. In this context an impression estimation system for estimating visual impressions of the plurality of vehicles may be utilized. The impression estimation system may include a server configured to receive vehicle mobility data generated by a mobile device application of each of the plurality of mobile devices and a database storing traffic volume data in association with a plurality of road segments. A computational platform may be configured to include a processor and program code which, when executed by the processor, causes the processor to, with respect to each vehicle of the plurality of vehicles: (i) identify, using the vehicle mobility data, one or more of the plurality of road segments in which the vehicle was present; (ii) estimate, using the traffic volume data, a number of potential visual impressions of the vehicle within the one or more of the plurality of road segments; (iii) determine an estimated number of visual impressions by modifying the number of potential visual impressions in accordance with an environmental filter wherein the environmental filter relates at least to an anticipated visibility of the vehicle to other vehicles present within the one or more of the plurality of road segments; (iv) generate visual impression information based at least in part upon the estimated number of visual impressions; and (v) provide the visual impression information for display by a display device.

Additional aspects of the present disclosure are further described below in conjunction with the drawings. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
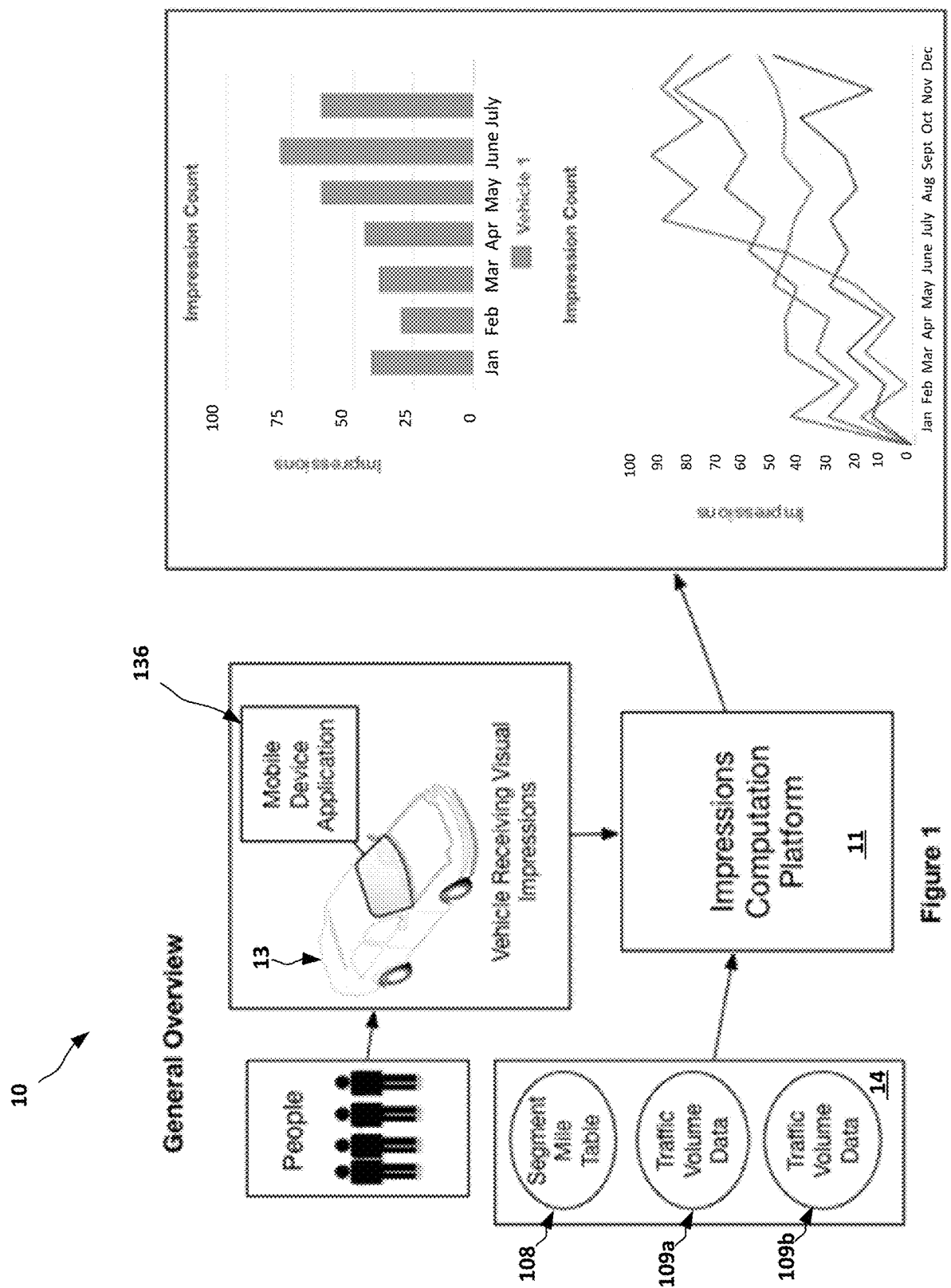
FIG. 1 provides an overview of a system for estimating visual impressions of vehicles configured with external graphic messaging and an associated representation of quantifiable visual impressions associated with a vehicle in the system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure.

Also, common but well-understood elements that are useful or necessary in a commercially feasible embodiment are often not depicted in order to facilitate a less obstructed view of these various embodiments of the present disclosure.

DETAILED DESCRIPTION

FIG. 1 provides an overview of a system 10 for estimating visual impressions of vehicles configured with external graphic messaging and an associated representation of quantifiable visual impressions associated with a vehicle in the system. As shown, the system 10 includes an impressions computation platform 11 capable of receiving information from a plurality of mobile device applications 136 associated with a plurality of vehicles 13 (represented in FIG. 1 by a single mobile device application and a single vehicle, respectively).

In one embodiment a removable canvas bearing graphic messaging is applied to each of the vehicles 13. In this way a given vehicle may be configured to convey different messaging over different time periods (e.g., the messaging conveyed by the vehicle may be changed every few months). In one embodiment the removable canvas comprises one or more film-based panels or segments configured to adhere to exterior surfaces of the vehicles 13. For example, the removable canvas may be in the form of a vinyl wrap or other media wrap/adhesive. Alternatively, one or more of the vehicles 13 may be equipped with digital signage capable of conveying the desired messaging.

The mobile device application 136 associated with each vehicle 13 is generally executed by a mobile communication device owned or controlled by an operator of the vehicle. In other embodiments the mobile device applications 136 may be executed by mobile communication devices integrated within the vehicles 13. As shown, the system 10 further includes a database 14 containing a segment mile table 108, a historical traffic volume table 109a and/or a real-time traffic volume data 109b.

During operation of the system of FIG. 1, one or both of historical and real time vehicle traffic volume for a geographic location (latitude and longitude) are used in producing a value representing the number of vehicles within a "road segment" within a distance of point A to point B. Utilizing a mobile device application 136 and tracking GPS latitude and longitude, time of day, and speed, while in a vehicle as it travels from point A to point B, the platform 11 may cross reference that traveled path with the calculated number of vehicles in multiple road segments making up the path of point A to point B based on the historical and real time traffic volume. The result is a quantifiable amount of visual impressions received from people in vehicles traveling by the target vehicle within the traveled road segments.

A parked vehicle can also derive from the calculated road segment. In particular, an estimate is made of the number of vehicles that have traveled past the parked vehicle and a number of visual impressions received by the parked vehicle is derived from the estimate.

Figure 2:
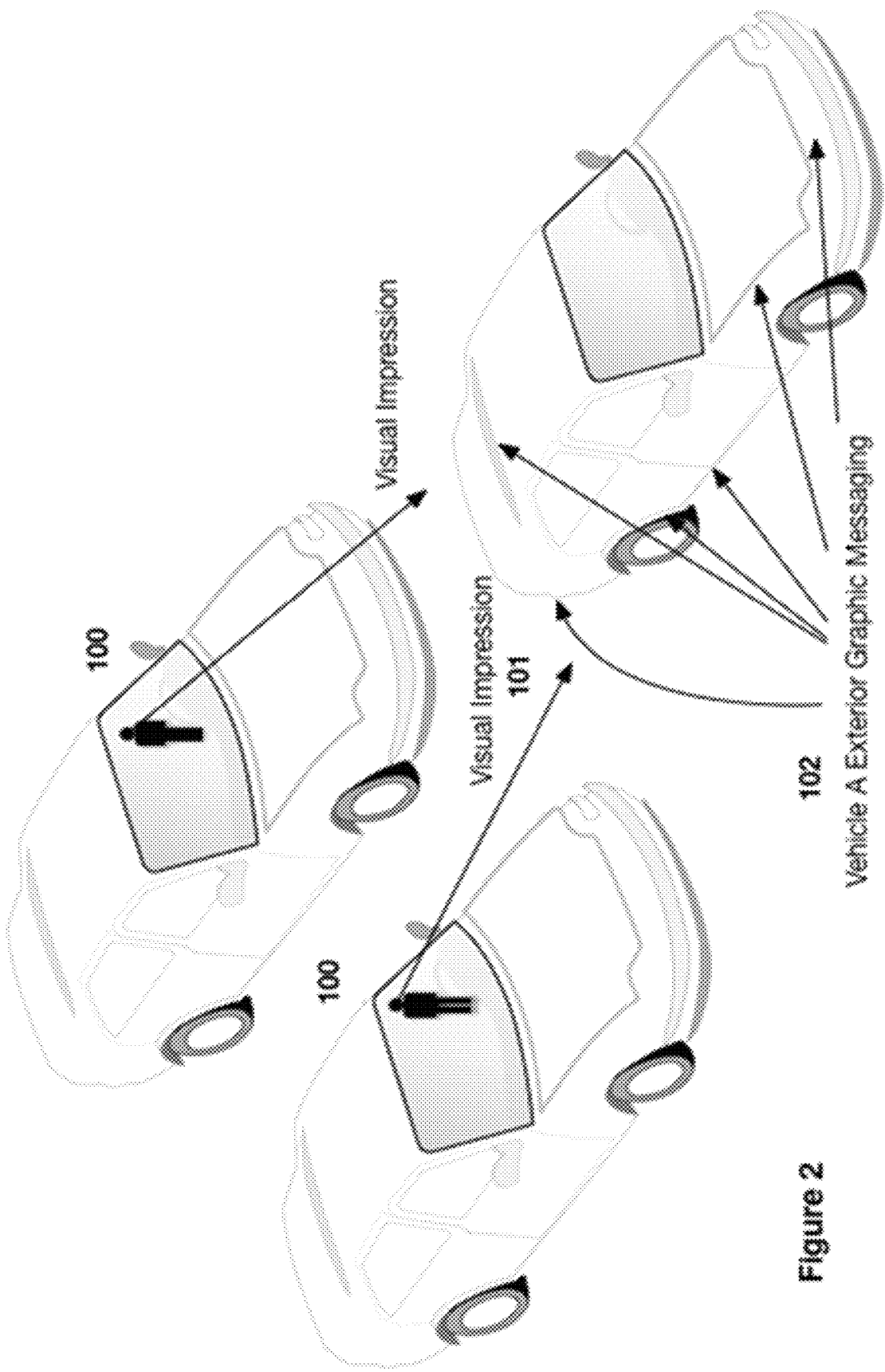
FIG. 2 illustrates visual impressions corresponding to visualization of a target vehicle with exterior graphic messaging.

FIG. 2 illustrates visual impressions corresponding to visualization of a target vehicle with exterior graphic messaging. In FIG. 2 people 100 in other vehicles are visually able to see 101 vehicle A's exterior graphic messaging 102. The people are in other vehicles 100 driving on the same road in either direction or freeway/highway. As discussed above, the exterior graphic messaging of Vehicle A 102 can be in the form of car vinyl wrap or other media wrap/adhesive, or viewable digital signage.

Figure 3:
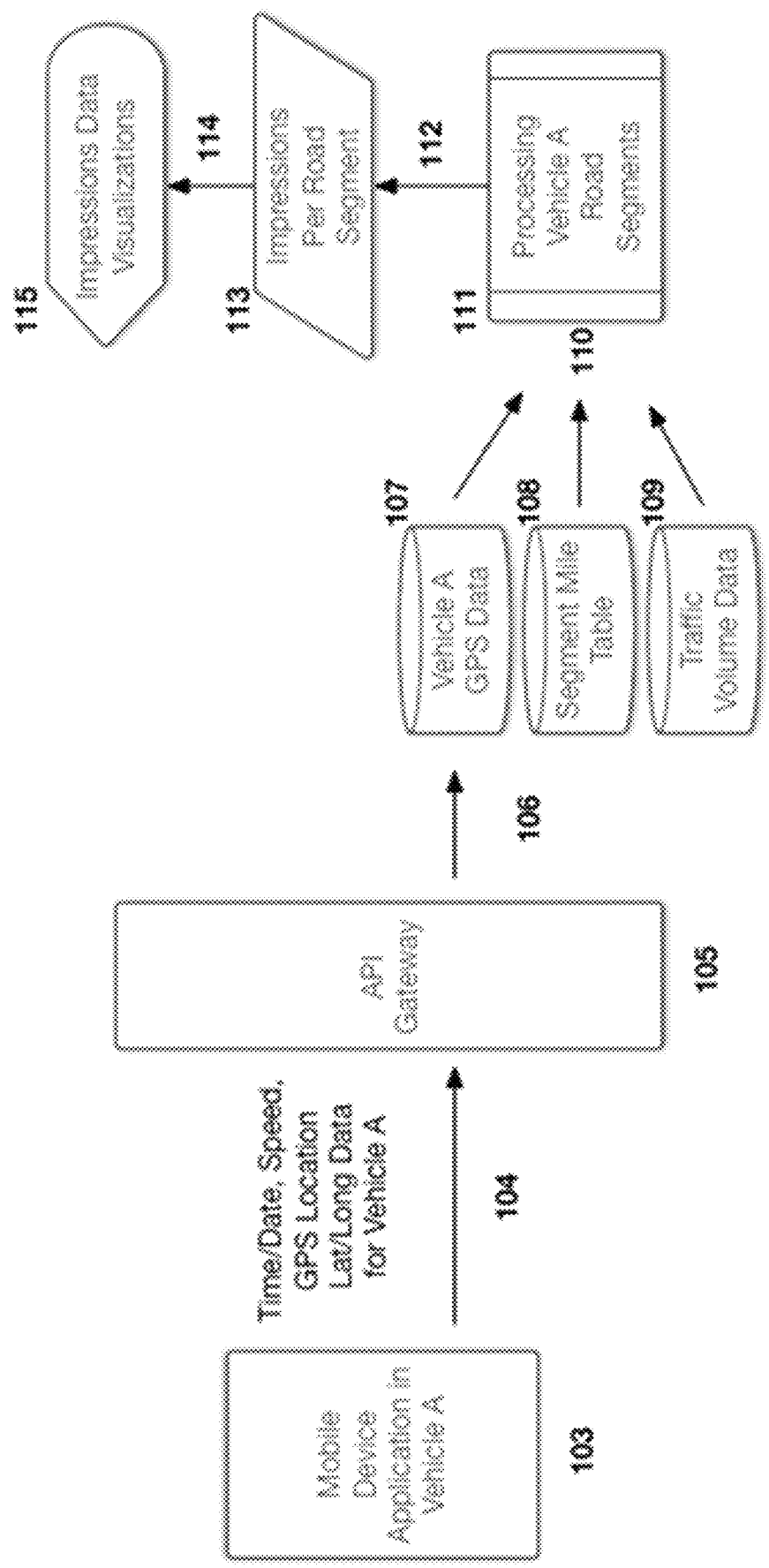
FIG. 3 is a flow chart of an exemplary workflow performed by a mobile device application in conjunction with a system platform.

Attention is now directed to FIG. 3, which is a flow chart of an exemplary workflow performed by a mobile device application in conjunction with a system platform. In the example of FIG. 3, mobile device 103 sends, to a platform API gateway 105 using a combination of GPS and cellular or Wi-Fi internet connectivity 104, GPS location latitude and longitude, speed, and time of day data for vehicle A every 1/10 of a mile traveled in real time. If Internet connectivity becomes unavailable, the GPS data is stored on the mobile device application 136 until Internet connectivity is re-established.

The API Gateway sends the data 106 to a database table 107 for storage and indexing of vehicle A location data. A segment mile database table 108 exists via imported shape files converted into a segment mile table. The segment mile database table 108 is cross referenced 110 with the vehicle A GPS data 107 and with a traffic volume table 109 in order to determine a number of cars and/or people are on the road for each segment driven 111. This in turn produces impressions per road segment 112, which is stored in a database table for vehicle A 113. The stored impressions information can be sent to any visualization system 114 and visualized 115.

Figure 4:
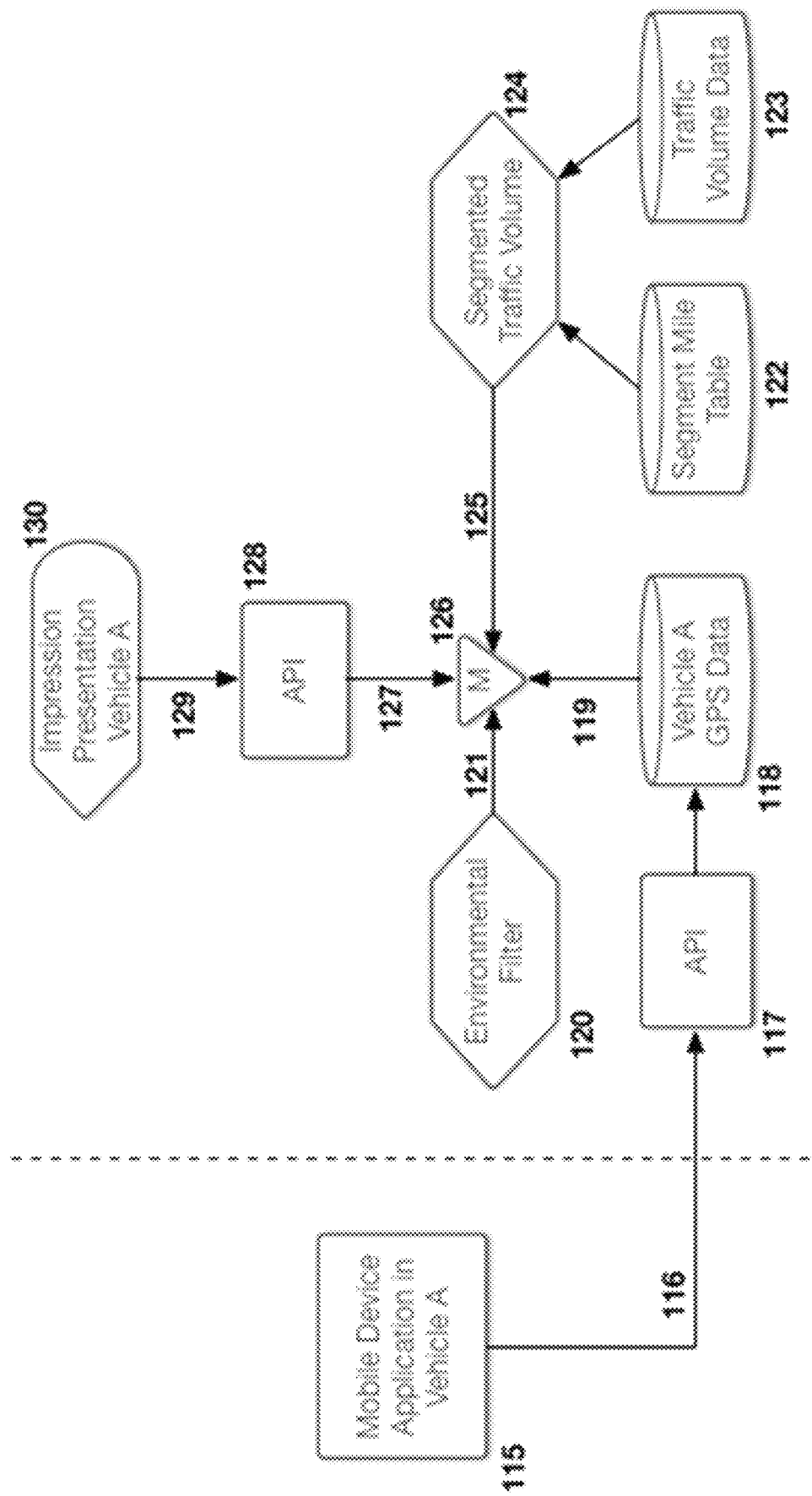
FIG. 4 is a flow chart of an exemplary platform impressions and scoring process capable of being implemented by the system of FIG. 1.

FIG. 4 is a flow chart of an exemplary platform impressions and scoring process. As shown, the exemplary process begins with the mobile device in vehicle A 115 sending GPS latitude and longitude, speed and time of day data every 1/10 of a mile 116 via posting to an API 117, which in turn stores the data in a database table 118. Another database table exists with segment mile data 122 derived from imported shape files (shp) correlating segment ID's with a certain mile distance. In order to import the shape file into the database, it is typically necessary to parse out the shape file into a comma separated file (csv) so as to import the data into the database. A separate database table holds traffic volume information indexed by segment ID 123. By referencing the segment mile table and the traffic volume data, a segmented traffic volume 124 can be derived. Combining 126 vehicle A GPS data 119 segmented traffic volume 125 and applying an environmental filter 121, an output is generated that is obtainable via an API 128 and thus retrievable 129 as a presentable set of impression data for vehicle A 130.

Figure 5:
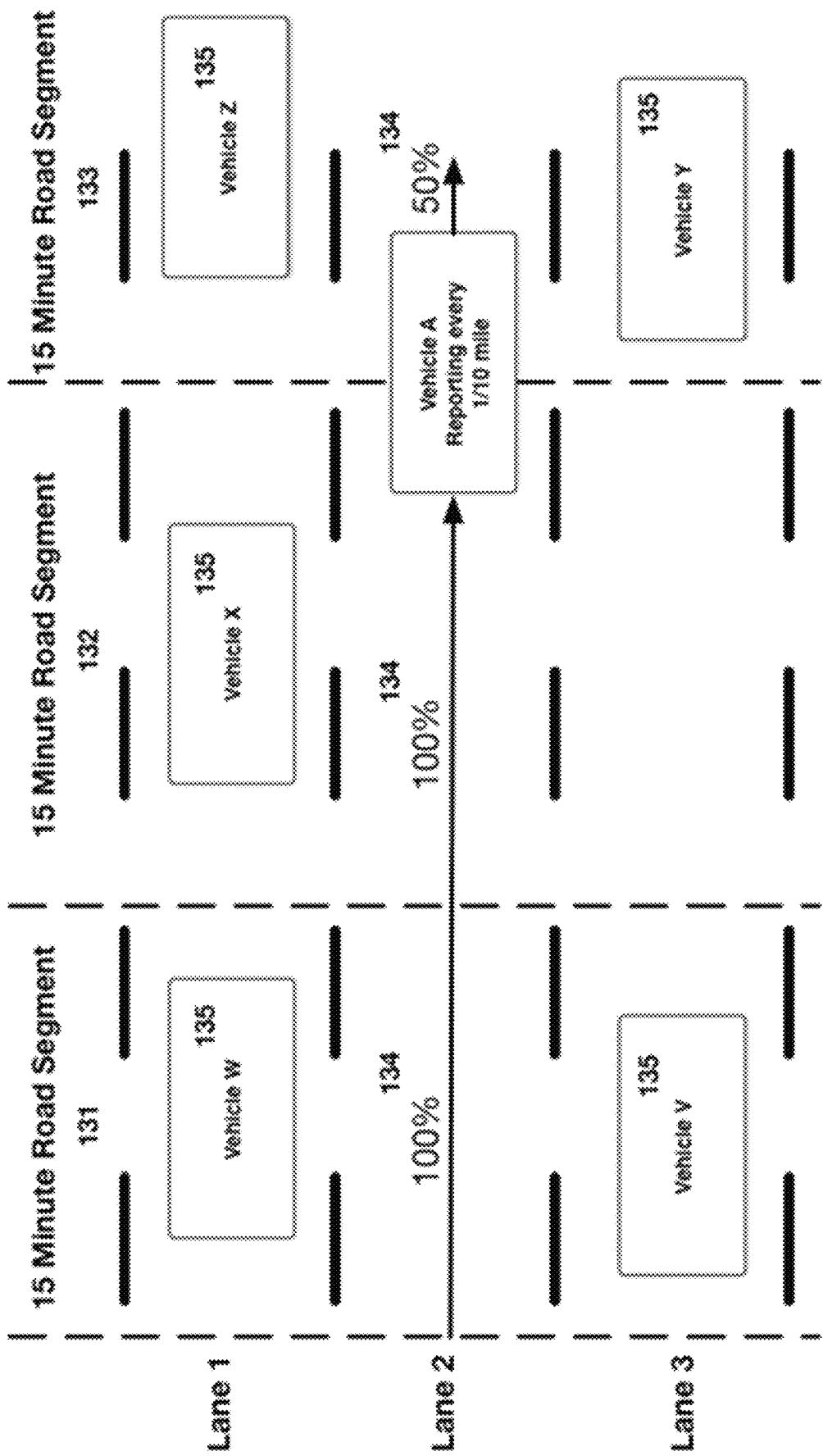
FIG. 5 provides an illustration of determination of a number of road segments traversed by a given vehicle.

FIG. 5 provides an illustration of determination of a number of road segments traversed by and associated with a given vehicle A. In the example of FIG. 5, the road segments 131 132 and 133 each represent a road segment of 15 minutes. Each road segment 131 132 and 133 is defined in a segment mile database table 122, which is indexed by road segment ID 122. As vehicle A travels through each road segment which, again, is a representation of 15 minutes of distance, a percentage 134 of segment completion by vehicle A is tracked. Each road segment may be associated with a number of vehicles 135 corresponding to, for example, the number of vehicles within the road segment at a given time. This number of vehicles may be determined in accordance with historical traffic data 123, real-time traffic data, or some combination thereof. In the specific case of FIG. 5, 3 road segments 131 132 and 133 have been traversed by vehicle A, where segments 131 and 132 have been 100% traveled and segment 133 has been 50% traveled. Segment 131 has 2 vehicles, segment 132 has 1 vehicle and segment 133 has 2 vehicles. Based on this segment traffic, vehicle A has received impressions from 4 vehicles. This assumes an exemplary approach in which estimates of the total number of vehicles capable of viewing vehicle A with each segment are added. Each such estimate may be obtained, for example, by using the percentage of each segment traveled by vehicle A in conjunction with historical data concerning the number of vehicles present within the relevant portions of the segment at the relevant times (i.e., the times at which vehicle A was positioned within various parts of the segment). Of course other approaches to estimating visual impressions within road segments may be used. For example, in some implementation it may be sufficient to determine that a vehicle has simply been present within a road segment in order for the vehicle to be accorded visual impressions corresponding to some or all of the vehicles within the road segment.

The environmental filter 120 may take into consideration the distance a vehicle can see vehicle A (e.g., 250 feet) and adjust the impression value accordingly. For example, in the case of an estimated visibility of 250 feet, those potential impressions associated with vehicles in the segment more than 250 feet away from vehicle A are not counted in determining the number of impressions for the segment. This filtered number of impressions for the segment is then processed based on a score for vehicle A's miles that takes into account current speed as a ratio to free flow speed (traffic flow conditions) as well as time of day 104.

In some embodiments the environmental filter 120 may apply a formula based on the traffic score to account for the reduced exchange of unique vehicles which may occur during heavy to moderate traffic congestion, or during night time driving (decreased visibility distance) even when traffic is free flowing. In these embodiments a categorization scoring range of 1-12 may be used, with 1 being a low score (e.g., light traffic (low speed) or poor visibility) to 12 being a high score (e.g., higher traffic (high speed) and good visibility). The result of the adjustments 121 is an estimate of the number of unique vehicles capable of seeing the target vehicle within the traveled distance.

Figure 6:
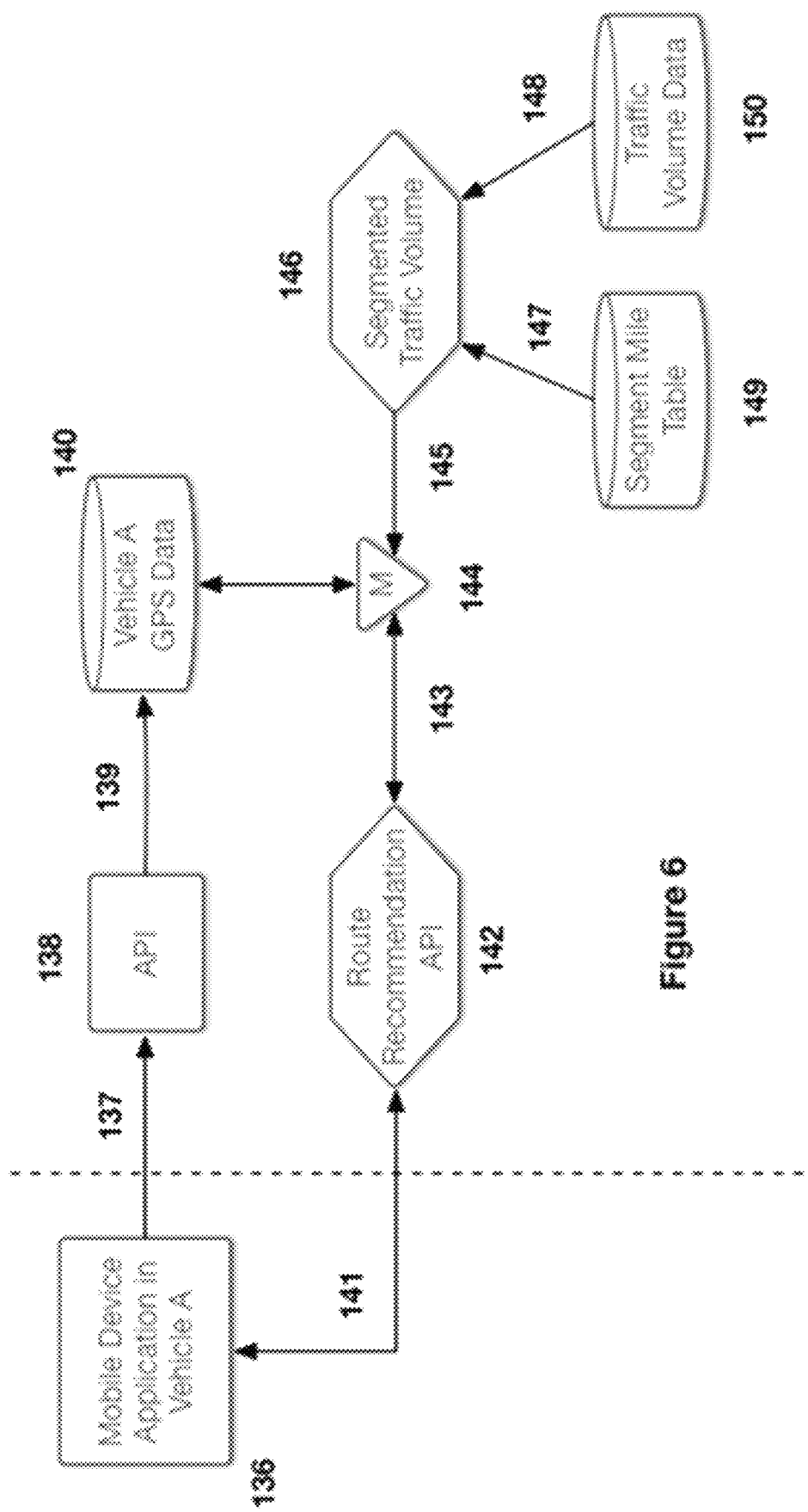
FIG. 6 is a flow chart illustrating an exemplary process for providing route recommendations which maximize visual impressions of the vehicle when navigated.

FIG. 6 is a flow chart illustrating an exemplary process for providing route recommendations which maximize visual impressions of a vehicle during travel to a specified destination. As noted above, the mobile device application 136 in vehicle A 136 sends GPS location latitude and longitude, and time/date data 137, to receiving API 138. In response, receiving API 138 inserts this information into a database table for vehicle A 140. Leveraging this data flow, the mobile device application 136 can request 141 a route recommendation from a route recommendation API 142. The recommendation API 142 requests 143 a merge of data 144 of vehicle A GPS, and time/date data 140, with 145 segmented traffic volume data 146. Again, the segmented traffic volume data 146 is typically formulated from the segment mile table 149 and traffic volume data 150.

The platforms route recommendation API 142 allows for a map overlay showing routes with the most impressions on the mobile device application in vehicle A 136. This provides the driver of vehicle A the ability to identify and drive routes resulting in a higher of visual impressions of the exterior messaging displayed by vehicle A. It also allows the mobile device application to message the driver route information that maximizes impressions.

Figure 7:
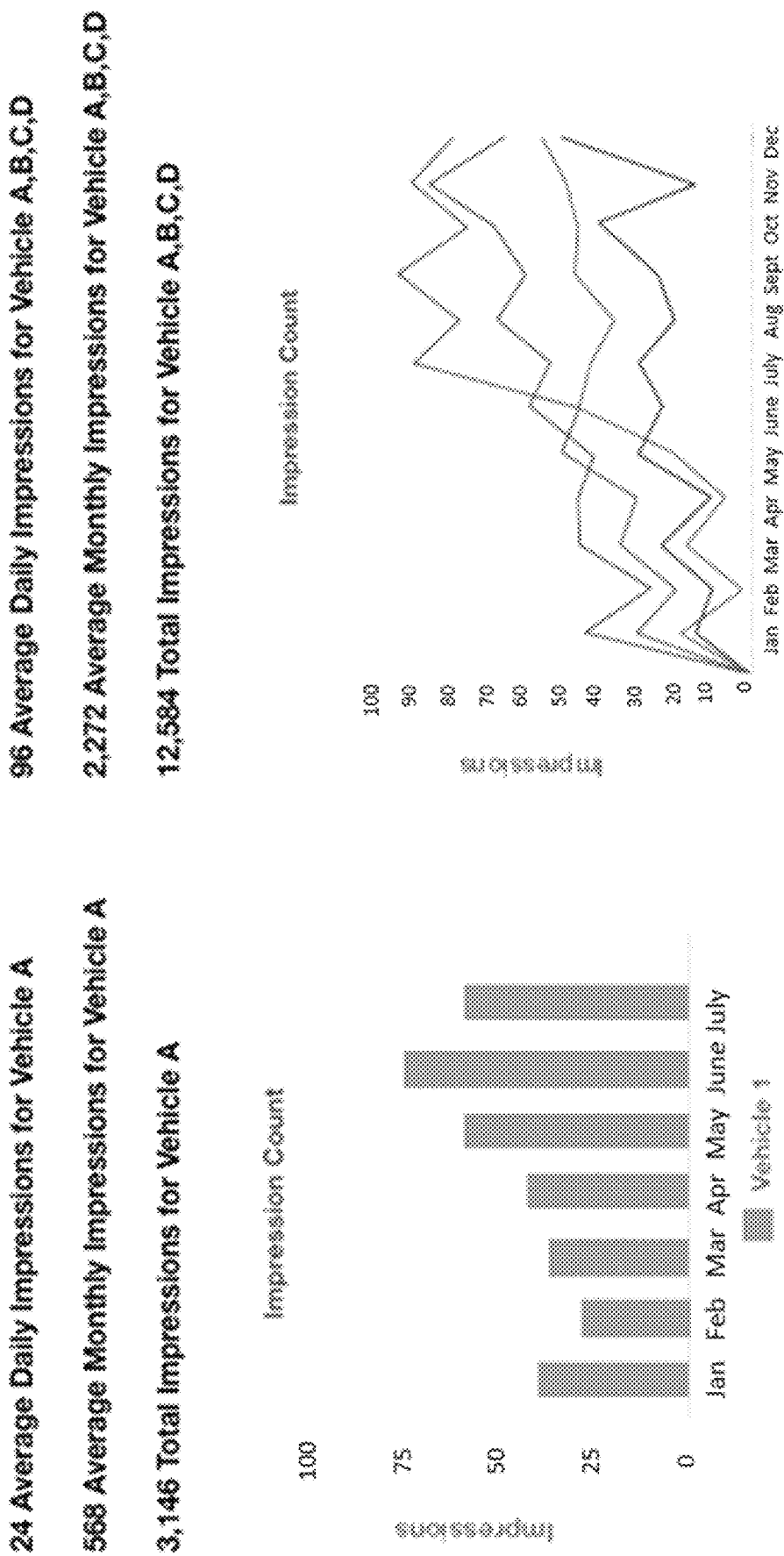
FIG. 7 illustrates a graphical representation of quantified visual impressions associated with a set of vehicle.

FIG. 7 illustrates a graphical representation of quantified visual impressions associated with a set of vehicle. Once the number of visual impressions that vehicle A has received from other vehicles has been determined as described herein, the resulting impression information may be displayed in numeric form or charts in, for example, the manner depicted in FIG. 7. This enables system users to readily view representations, in multiple different forms, of the visual impressions associated with a particular vehicle (e.g., vehicle A) over a particular time period. In addition, the of sum visual impressions associated with multiple vehicles (e.g., vehicles A, B, C, D), whether such multiple vehicles are parked or traveling routes, may also be presented in multiple different visualization formats.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. In a system including a plurality of vehicles having exteriors configured to convey messaging to occupants of other vehicles wherein each of the vehicles are configured with exterior graphic messaging associated with a product or service and a plurality of mobile devices associated with the plurality of vehicles, an impression estimation system for estimating visual impressions of the plurality of vehicles, the impression estimation system comprising:
   a gateway API to which is posted vehicle mobility data generated by a mobile device application of each of the plurality of mobile devices wherein the mobility data includes data specifying locations of each of the plurality of vehicles at associated times;
   a database storing traffic volume data in association with a plurality of road segments defined in a segment mile database table; and
   a computational platform including a processor and program code which, when executed by the processor, causes the processor to, with respect to each vehicle of the plurality of vehicles:
      determine a set of road segments traversed by the vehicle by tracking, using the mobility data, a percentage of each of the road segments traversed by the vehicle wherein the tracking includes determining that at least one of the set of road segments was only partially traversed by the vehicle;
      determine an estimated number of visual impressions by using the percentage of each of the road segments traversed by the vehicle in conjunction with portions of the traffic volume data concerning numbers of the other vehicles present within parts of the road segments at times which the vehicle was positioned within the parts of the road segments;
      generate visual impression information based at least in part upon the estimated number of visual impressions;
      provide the visual impression information for display by a display device.

2. The impression estimation system of claim 1 wherein the program code to determine the estimated number of visual impressions includes program code causing the processor to, with respect to each vehicle of the plurality of vehicles:

estimate, using the traffic volume data, a number of potential visual impressions of the vehicle within the set of road segments;

modify the number of potential visual impressions in accordance with an environmental filter wherein the environmental filter relates at least to an anticipated visibility of the vehicle to other vehicles present within the set of road segments.

3. The system of claim 1 wherein the mobility data includes road segment data identifying a percentage of a first road segment traversed by the vehicle and a percentage of a second road segment traversed by the vehicle, the first road segment and the second road segment being included within the set of road segments.

4. The system of claim 1 wherein the program code causing the processor to determine the estimated number of visual impressions includes program code causing the processor to determine, for each segment of the road segments, a relationship between a speed of the vehicle within the segment at a given time and a free flow speed of traffic within the segment at the given time.

5. The system of claim 1 wherein the vehicle mobility data is included within wireless signals generated by each of the plurality of mobile devices wherein each of the plurality of mobile devices is configured with a GPS receiver configured to cooperate with the mobile device application in determining information relating to mobility of the vehicle.

6. A method for estimating visual impressions of a vehicle configured with exterior graphic messaging intended for viewing by occupants of other vehicles, the method including:

receiving, from a server, vehicle mobility data generated by a mobile device application of a mobile device associated with the vehicle wherein the mobility data includes data specifying locations of the vehicle at associated times;

storing traffic volume data in association with a plurality of road segments defined in a segment mile database table;

identifying a set of road segments traversed by the vehicle by tracking, using the mobility data, a percentage of each of the road segments traversed by the vehicle wherein the tracking includes determining that at least one of the set of road segments was only partially traversed by the vehicle;

determining an estimated number of visual impressions by using the percentage of each of the road segments traversed by the vehicle in conjunction with portions of the traffic volume data concerning numbers of the other vehicles present within parts of the road segments at times which the vehicle was positioned within the parts of the road segments;

generating visual impression information based at least in part upon the estimated number of visual impressions; and providing the visual impression information for display by a display device.

* * * * *